United States Patent
Ren et al.

(10) Patent No.: US 12,489,815 B1
(45) Date of Patent: Dec. 2, 2025

(54) TOOLBOX AND CONTEXT FOR USER INTERACTIONS

(71) Applicant: Apple Inc., Cupertino, CA (US)

(72) Inventors: Miao Ren, Sunnyvale, CA (US); Connor A. Smith, San Mateo, CA (US); Bruno M. Sommer, Sunnyvale, CA (US); Tucker B. Morgan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/470,077

(22) Filed: Sep. 19, 2023

Related U.S. Application Data

(63) Continuation of application No. 17/317,205, filed on May 11, 2021, now Pat. No. 11,805,176.

(60) Provisional application No. 63/022,943, filed on May 11, 2020.

(51) Int. Cl.
*H04L 67/131* (2022.01)
*G06T 19/00* (2011.01)
*H04L 67/1095* (2022.01)
*H04L 67/30* (2022.01)
*H04L 67/50* (2022.01)

(52) U.S. Cl.
CPC .......... *H04L 67/131* (2022.05); *G06T 19/006* (2013.01); *H04L 67/1095* (2013.01); *H04L 67/30* (2013.01); *H04L 67/535* (2022.05)

(58) Field of Classification Search
CPC ..... H04L 67/131; H04L 67/535; H04L 67/30; H04L 67/1095; G06T 19/006
See application file for complete search history.

(56) References Cited

U.S. PATENT DOCUMENTS

| | | | | |
|---|---|---|---|---|
| 5,689,669 A | * | 11/1997 | Lynch | G06F 3/0481 715/848 |
| 6,002,853 A | * | 12/1999 | de Hond | G06F 16/954 709/219 |
| 6,119,147 A | * | 9/2000 | Toomey | G06Q 10/109 719/329 |
| 6,219,045 B1 | * | 4/2001 | Leahy | H04L 67/10 709/204 |
| 6,243,091 B1 | * | 6/2001 | Berstis | G06F 3/04815 715/205 |
| 6,271,843 B1 | * | 8/2001 | Lection | G06T 15/00 715/848 |
| 6,362,817 B1 | * | 3/2002 | Powers | G06T 17/00 345/428 |

(Continued)

OTHER PUBLICATIONS

Feick, et al., "Mixed-Reality for Object-Focused Remote Collaboration," UIST '18 Adjunct, Oct. 14-17, 2018.

(Continued)

*Primary Examiner* — Nicholas Augustine
(74) *Attorney, Agent, or Firm* — Blank Rome LLP

(57) ABSTRACT

Facilitating collaboration in a multi-user communication session may include, at a first device, providing a toolkit of system-level tools for interacting within the session with a second device. A first user interaction with a first tool is detected which results in a virtual modification to an environment of the first device. In response to the first user interaction, the virtual modification is provided for presentation in a second environment representation of the session corresponding to the second device.

20 Claims, 9 Drawing Sheets

(56) References Cited

U.S. PATENT DOCUMENTS

| | | | | |
|---|---|---|---|---|
| 6,396,522 | B1* | 5/2002 | Vu | G06F 3/04845 |
| | | | | 715/848 |
| 6,414,679 | B1* | 7/2002 | Miodonski | G06T 13/00 |
| | | | | 707/999.005 |
| 6,570,563 | B1* | 5/2003 | Honda | A63F 13/352 |
| | | | | 345/473 |
| 6,573,903 | B2 | 6/2003 | Gantt | G06F 30/00 |
| | | | | 345/619 |
| 6,590,593 | B1* | 7/2003 | Robertson | G06F 3/04815 |
| | | | | 715/848 |
| 6,621,508 | B1* | 9/2003 | Shiraishi | G06F 3/0481 |
| | | | | 715/764 |
| 6,690,393 | B2* | 2/2004 | Heron | G06T 19/00 |
| | | | | 715/848 |
| 6,784,901 | B1* | 8/2004 | Harvey | H04L 67/02 |
| | | | | 715/848 |
| 6,961,055 | B2* | 11/2005 | Doak | A63F 13/63 |
| | | | | 345/677 |
| 7,382,288 | B1* | 6/2008 | Wilson | G08G 5/21 |
| | | | | 340/972 |
| 7,414,629 | B2* | 8/2008 | Santodomingo | G06T 17/05 |
| | | | | 345/582 |
| 7,467,356 | B2* | 12/2008 | Gettman | G06Q 30/02 |
| | | | | 715/850 |
| 7,653,877 | B2* | 1/2010 | Matsuda | G06F 16/957 |
| | | | | 463/32 |
| 7,663,625 | B2* | 2/2010 | Chartier | G06T 19/20 |
| | | | | 700/182 |
| 7,746,343 | B1* | 6/2010 | Charaniya | G06N 7/01 |
| | | | | 345/428 |
| 7,788,323 | B2* | 8/2010 | Greenstein | G06Q 10/10 |
| | | | | 715/744 |
| 7,814,429 | B2* | 10/2010 | Buffet | G06F 30/00 |
| | | | | 715/763 |
| 7,817,150 | B2* | 10/2010 | Reichard | G06T 15/20 |
| | | | | 715/705 |
| 7,844,724 | B2* | 11/2010 | Van Wie | H04L 67/131 |
| | | | | 709/227 |
| 9,740,293 | B2 | 8/2017 | Kramer | |
| 10,242,501 | B1 | 3/2019 | Pusch | |
| 10,389,766 | B2* | 8/2019 | Zhou | H04L 65/403 |
| 10,403,050 | B1 | 9/2019 | Beall | |
| 10,721,280 | B1* | 7/2020 | Heppner | H04L 65/403 |
| 10,780,349 | B2* | 9/2020 | Hrinčár | A63F 13/54 |
| 2001/0018667 | A1* | 8/2001 | Kim | G06Q 30/0277 |
| | | | | 705/14.73 |
| 2002/0095463 | A1* | 7/2002 | Matsuda | G06F 16/957 |
| | | | | 709/204 |
| 2002/0113820 | A1* | 8/2002 | Robinson | G06F 16/954 |
| | | | | 715/764 |
| 2003/0177187 | A1 | 9/2003 | Levine | |
| 2005/0093719 | A1* | 5/2005 | Okamoto | G01C 21/3697 |
| | | | | 705/14.62 |
| 2005/0128212 | A1* | 6/2005 | Edecker | G06T 17/05 |
| | | | | 345/581 |
| 2008/0235570 | A1* | 9/2008 | Sawada | G06Q 10/10 |
| | | | | 356/3 |
| 2012/0056992 | A1* | 3/2012 | Kuroda | G06T 19/006 |
| | | | | 348/46 |
| 2012/0233555 | A1* | 9/2012 | Psistakis | G11B 27/034 |
| | | | | 715/751 |
| 2013/0290233 | A1 | 10/2013 | Ferren | |
| 2014/0002443 | A1* | 1/2014 | Cunningham | G06T 19/006 |
| | | | | 345/419 |
| 2016/0030835 | A1 | 2/2016 | Argiro | |
| 2016/0071320 | A1 | 3/2016 | Smith | |
| 2016/0093108 | A1 | 3/2016 | Mao | |
| 2016/0378861 | A1 | 12/2016 | Eledath | |
| 2017/0064214 | A1* | 3/2017 | Zhang | H04N 23/11 |
| 2018/0005443 | A1 | 1/2018 | Poulos | |
| 2018/0061132 | A1 | 3/2018 | Lanier | |
| 2018/0095617 | A1* | 4/2018 | Valdivia | G06F 3/011 |
| 2018/0300433 | A1 | 10/2018 | Maxam | |
| 2019/0019022 | A1 | 1/2019 | Marda | |
| 2019/0057529 | A1 | 2/2019 | Diverdi | |
| 2019/0066387 | A1 | 2/2019 | Grossmann | |
| 2019/0098255 | A1 | 3/2019 | Bergmann | |
| 2019/0297155 | A1 | 9/2019 | Baumgarten | |
| 2019/0310761 | A1 | 10/2019 | Agarawala | |
| 2019/0313059 | A1* | 10/2019 | Agarawala | G06F 3/011 |
| 2019/0378333 | A1* | 12/2019 | Castaneda | G06T 7/251 |
| 2020/0066049 | A1 | 2/2020 | Sun | |
| 2020/0103843 | A1* | 4/2020 | Stump | G05B 19/052 |
| 2021/0125409 | A1* | 4/2021 | Mirza | G06V 40/20 |

OTHER PUBLICATIONS

Teo, et al., "Investigating the use of Different Visual Cues to Improve Social Presence within a 360 Mixed Reality Remote Collaboration," The 17th International Conference on Virtual-Reality Continuum and its Applications in Industry, Nov. 2019.

* cited by examiner

TOOLBOX AND CONTEXT FOR USER INTERACTIONS

BACKGROUND

This disclosure relates generally to extended reality environments. More particularly, but not by way of limitation, this disclosure relates to techniques and systems for providing tools to enhance multi-user communication in a multi-user communication session within an extended reality environment.

Some devices are capable of generating and presenting extended reality (XR) environments. An XR environment may include a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. Some XR environments allow multiple users to interact with each other within the XR environment. However, what is needed is an improved technique to provide virtual modifications within an XR environment.

DETAILED DESCRIPTION

Figure 1:
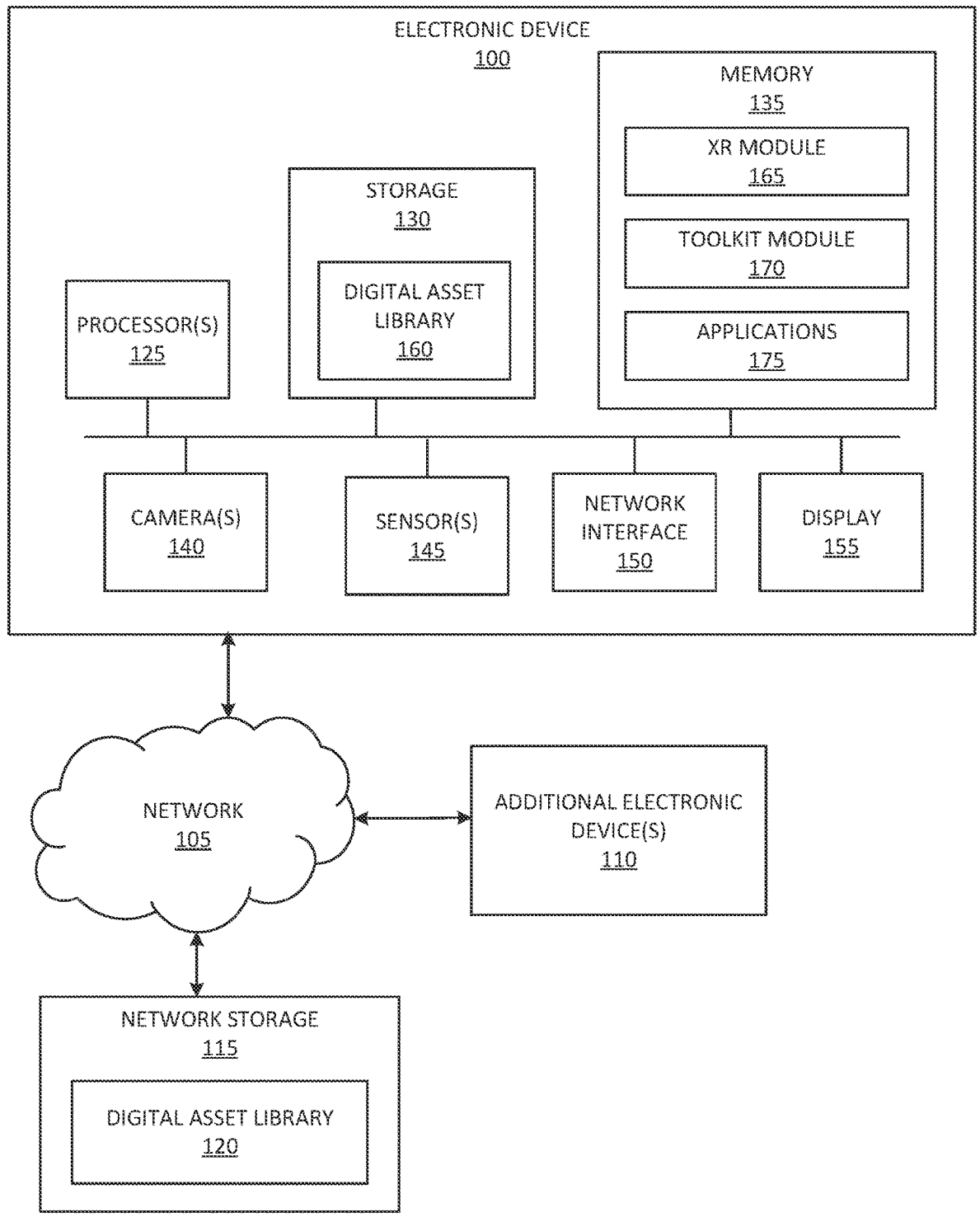
FIG. 1 shows, in block diagram form, a simplified system diagram according to one or more embodiments.

This disclosure pertains to systems, methods, and computer readable media to provide a system-level toolkit that includes system-level tools which may be utilized to provide virtual modifications in a multi-user communication session. In particular, a user utilizing a first device that is in an active multi-user communication session with a second device may utilize one or more of the tools to generate a virtual modification within a shared multi-user communication session with the second device. That is, a first device in a first physical environment may utilize a tool from the system-level toolkit in order to generate a virtual modification, and the virtual modification is shared for presentation at a second device in a second physical environment. According to one or more embodiments, the system-level toolkit may be utilized across one or more applications running on an electronic device. Further, the system-level toolkit may be modified or specialized according to one or more applications running on the device, or based on contextual information related to the user, the environment, the multi-user communication session, or the like.

In one or more embodiments, the system-level toolkit may be provided as a menu of tools which may be selected and utilized by a user. In one or more embodiments, the particular tools provided in the menu, and/or the ordering of the tools provided in the menu may be determined in accordance with various applications, user preferences, system preferences, and the like. According to one or more embodiments, when one or more of the tools are selected, candidate regions on which the tool may be used within the environment may be identified.

Once the user has utilized a tool to generate a virtual modification in an environment, that virtual modification may be communicated to other active devices in the multi-user communication session. The virtual modification may be communicated in a number of ways. As an example, the content and the location of the content may be transmitted to an application in which the modification is made such that the instance of the application on the additional devices may cause the virtual modification to be rendered in a consistent manner with the original device. As another example, the content and location of the contents of the virtual modification may be transmitted to an XR module of the additional devices in order to render the virtual modification while bypassing the application in which, or on which, the virtual modification is made.

According to one or more embodiments, the system-level toolkit may be provided at any time. In one or more embodiments, the system-level toolkit may be offered in accordance with a determination of an inconsistency in a presentation of virtual items within representations of multi-user communication sessions in which the various electronic devices are active. If an inconsistency in a presentation among various environments is determined, then a device from which a virtual modification is made may provide a spatial relationship between the virtual modification and the environment in which the virtual modification is made. According to one or more embodiments, the location of the virtual modification may be provided in relation to a portion of the environment corresponding to the virtual modification. As such, the second device may render the virtual modification according to the surface of an object associated with the virtual modification, regardless of the location of the user generating the virtual modification, according to one or more embodiments.

Various examples of electronic systems and techniques for using such systems in relation to various extended reality technologies are described.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. For purposes of this disclosure, a multi-user communication session can include an XR environment in which two or more devices are participating.

For purposes of this disclosure, a local multi-user communication device refers to a current device being described, or being controlled by a user being described, in a multi-user communication session.

For purposes of this disclosure, collocated multi-user communication devices refer to two devices that share a physical environment and an XR environment, such that the users of the collocated devices may experience the same physical objects and XR objects, such as virtual objects.

For purposes of this disclosure, a remote multi-user communication device refers to a secondary device that is located in a separate physical environment from a current, local multi-user communication device. In one or more embodiments, the remote multi-user communication device may be a participant in the XR session.

For purposes of this disclosure, shared virtual elements refer to XR objects that are visible or otherwise able to be experienced by participants in a common XR session.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics modeling systems having the benefit of this disclosure.

Referring to FIG. 1, a simplified block diagram of an electronic device 100 is depicted, communicably connected to additional electronic devices 110 and a network storage 115 over a network 105, in accordance with one or more embodiments of the disclosure. Electronic device 100 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 100, additional electronic device 110, and/or network storage 115 may additionally, or alternatively, include one or more additional devices within which the various functionality may be contained, or across which the various functionality may be distributed, such as server devices, base stations, accessory devices, and the like. Illustrative networks, such as network 105 include, but are not limited to, a local network such as a universal serial bus (USB) network, an organization's local area network, and a wide area network such as the Internet. According to one or more embodiments, electronic device 100 is utilized to participate in a multi-user communication session in an XR environment. It should be understood that the various components and functionality within electronic device 100, additional electronic device 110 and network storage 115 may be differently distributed across the devices, or may be distributed across additional devices.

Electronic Device 100 may include one or more processors 125, such as a central processing unit (CPU). Processor(s) 125 may include a system-on-chip such as those found in mobile devices and include one or more dedicated graphics processing units (GPUs). Further, processor(s) 125 may include multiple processors of the same or different type. Electronic device 100 may also include a memory 135. Memory 135 may include one or more different types of memory, which may be used for performing device functions in conjunction with processor(s) 125. For example, memory 135 may include cache, ROM, RAM, or any kind of transitory or non-transitory computer readable storage medium capable of storing computer readable code. Memory 135 may store various programming modules for execution by processor(s) 125, including XR module 165, toolkit module 170, and other various applications 175. Electronic device 100 may also include storage 130. Storage 130 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Storage 130 may be configured to store a digital asset library 160, according to one or more embodiments. Electronic device may additionally include a network interface 150 from which the electronic device 100 can communicate across network 105.

Electronic device 100 may also include one or more cameras 140 or other sensors 145, such as depth sensor, from which depth or other characteristic of an environment may be determined. In one or more embodiments, each of the one or more cameras 140 may be a traditional RGB camera, or a depth camera. Further, cameras 140 may include a stereo- or other multi-camera system, a time-of-flight camera system, or the like. Electronic device 100 may also include a display 155. The display device 155 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Storage 130 may be utilized to store various data and structures which may be utilized for providing state information in order to track an application and system state. Storage 130 may include, for example, digital asset library 160. Digital asset library 160 may be utilized to store data related to digital assets that may be utilized within an XR multi-user communication session.

According to one or more embodiments, memory 135 may include one or more modules that comprise computer readable code executable by the processor(s) 125 to perform functions. The memory may include, for example an appearance XR module 165 which may be used to provide a multi-user communication session in an XR environment. The multi-user communication session XR environment may be a computing environment which supports a shared experience by electronic device 100 as well as additional electronic devices 110.

The memory 135 may also include a toolkit module 170, which provides system-level tools that may be utilized by a user in the XR environment to make virtual modifications to the environment, such as by XR module 165. The toolkit module 170 may provide the set of tools for use at any time, or in response to detecting an inconsistency in presentation between electronic device 100 and one or more additional electronic devices 110. The toolkit module 170 may provide, for example, access to a virtual writing surface, a virtual camera, a virtual pointing device, a virtual dictation tool, a virtual gesturing tool, a virtual library tool, and a virtual editing tool. The virtual library tool may include an interface to access digital items, such as those stored in the digital asset library 160.

Applications 175 may include, for example, computer applications that may be experienced in an XR environment by multiple devices, such as electronic device 100 and additional electronic devices 110. In one or more embodiments, the toolkit module 170 may provide tools to utilize in addition to or within applications 175.

Although electronic device 100 is depicted as comprising the numerous components described above, in one or more embodiments, the various components may be distributed across multiple devices. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 2:
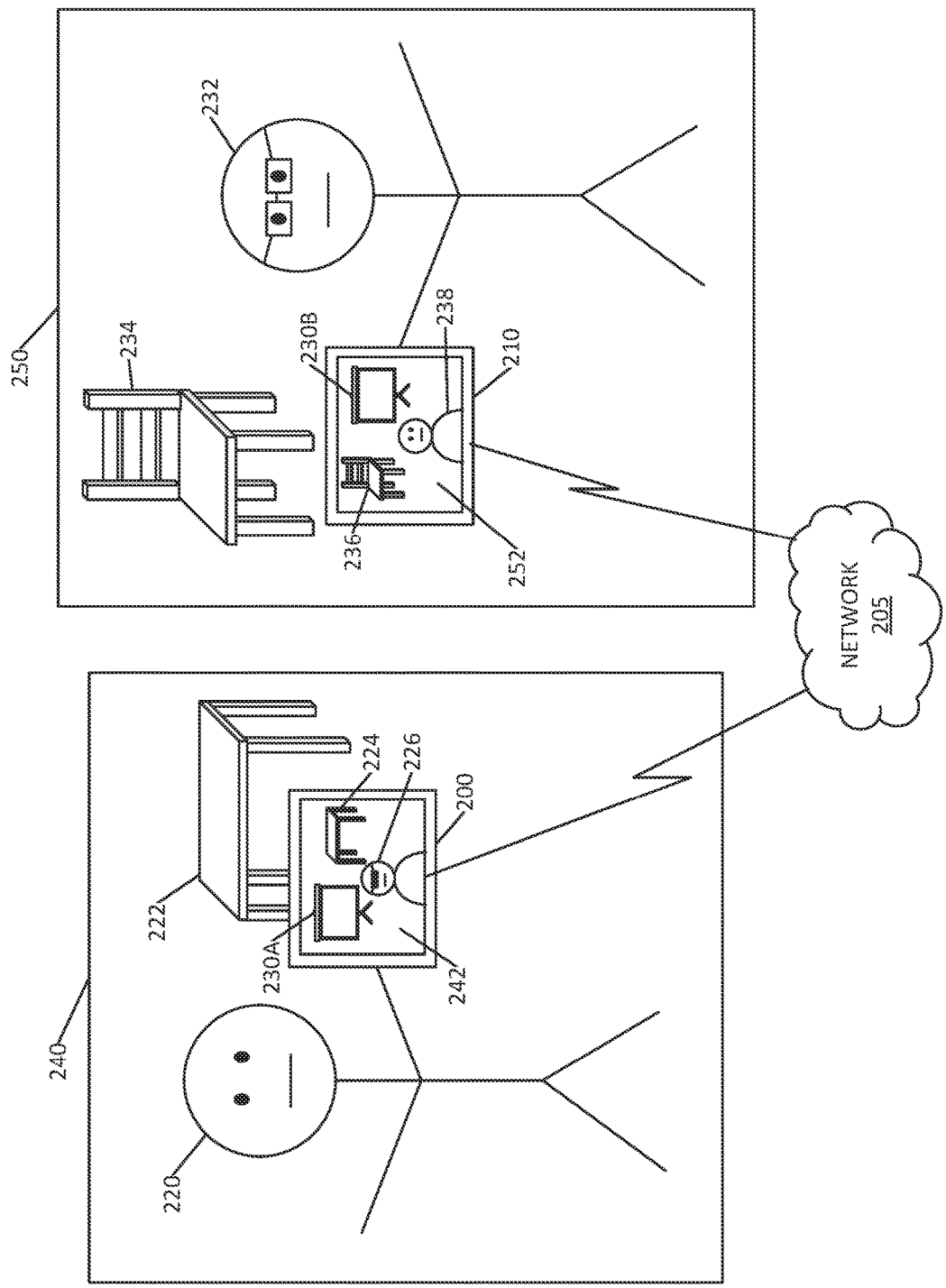
FIG. 2 shows a diagram of example operating environments, according to one or more embodiments.

FIG. 2 shows a diagram of example operating environments, according to one or more embodiments. While pertinent features are shown, those of ordinary skill in the art will appreciate from the present disclosure that various other features have not been illustrated for the sake of brevity and so as not to obscure more pertinent aspects of the example among implementations disclosed herein. To that end, as a nonlimiting example, the operating environment 240 includes a first physical environment, whereas operating environment 250 includes a second physical environment.

As shown in FIG. 2, the first environment 240 includes a first user 220 that is utilizing a first electronic device 200, and the second environment 250 includes a second user 232 that is utilizing a second electronic device 210. In one or more embodiments, the first electronic device 200 and the second electronic device 210 include mobile devices, such as handheld devices, wearable devices, and the like.

In one or more embodiments the first electronic device 200 and the second electronic device 210 communicate with each other via a network 205. Examples of network 205 may include, for example, the Internet, a wide area network (WAN), a local area network (LAN), etc. In one or more embodiments, the first electronic device 200 and the second electronic device 210 may be participating in a common multi-user communication session.

Although electronic device 200 and electronic device 210 may be participating in a common multi-user communication session, the shared virtual objects may be rendered differently on each device. As shown, the electronic device 200 may depict physical objects of the environment 240. As shown, physical table 222 may be depicted on the display 242 as a virtual table 224. In one or more embodiments, the display 242 may be a see-through display, and virtual table 224 may simply be a view of physical table 222 through display 242.

Display 242 of electronic device 200 may also include an avatar 226 corresponding to user 232. For purposes of this disclosure, and avatar may include a virtual representation of a user. The avatar may depict real-time actions of the corresponding user 232, including movement, updated location, and/or interactions with various physical components and/or virtual components within the XR environment. An avatar may or may not mimic physical characteristics of the user, and may or may not mimic facial expressions of the user.

According to one or more embodiments, a multi-user communication session may support one or more multi-user applications or other modules which allow for depictions of shared virtual objects across multiple participating devices, such as electronic device 200 and electronic device 210. As shown in display 242, presentation panel 230A is an example of a virtual object which may be visible to all participating devices.

As an example, returning to environment 250, electronic device 210 includes a display 252, on which the presentation panel virtual object 230B is depicted. It should be understood that in one or more embodiments, although the same virtual object may be visible across all participating devices, the virtual object may be rendered differently according to the location of the electronic device, the orientation of the electronic device, or other physical or virtual characteristics associated with electronic devices 200 and 210 and/or the representation of the multi-user communication session depicted within displays 242 and 252.

Returning to environment 250, a physical chair 234 is depicted as virtual chair 236. As described above, and one or more embodiments, display 252 may be a see-through display, and virtual chair 236 may be a view of physical chair 234 through the see-through display 252. In addition, electronic device 210 depicts an avatar 238 corresponding to user 220 within physical environment 240. Another characteristic of a multi-user communication session XR environment is that while virtual objects may be shared across participating devices, physical worlds may appear different. As such, the representations of the multi-user communication session may differ across devices. For instance, the XR environment depicted in display 242 includes presentation panel 230A that also appears in the XR environment depicted in display 252. However, the XR environment depicted in display 242 includes representation 224 of physical table 222, which is not included in the XR environment depicted in display 252. Similarly, the XR environment depicted in display 252 includes representation 236 of physical chair 234, which is not included in the XR environment depicted in display 242.

According to one or more embodiments, the virtual objects, such as presentation panel 230, may be rendered as part of an application. In one or more embodiments, multiple applications may be executed within the XR environments depicted in 242 and 252.

Figure 3:
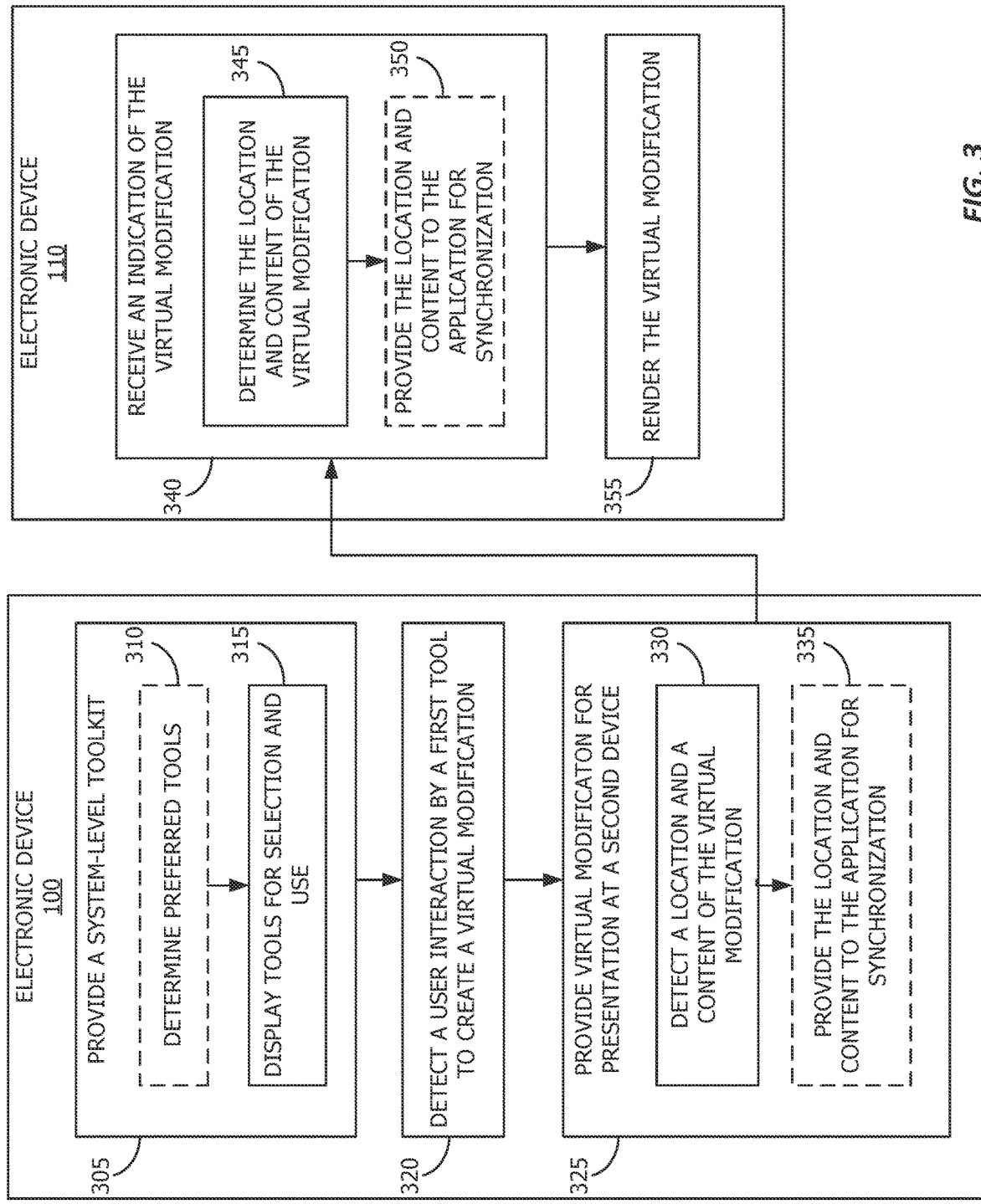
FIG. 3 shows a flowchart of a method for utilizing tools to provide a virtual modification in an XR environment.

FIG. 3 shows a flowchart of a method for utilizing tools to provide a virtual modification in an XR environment for a multi-user communication session. For purposes of explanation, the flowchart is described utilizing example components from FIG. 1. Although the flowchart shows various procedures performed by particular components in a particular order, it should be understood that according to one or more embodiments, the various processes may be performed by alternative devices or modules. In addition, the various processes may be performed in an alternative order, and various combinations of the processes may be performed simultaneously. Further, according to some embodiments, one or more of the processes may be omitted, or others may be added.

The flowchart begins at 305, where the toolkit module 170 provides the system-level toolkit. The toolkit may be a system-level toolkit in that it is tied to the computing environment of the device, and not to any particular third party application. That is, the toolkit may be accessible regardless of a particular application running on the device. According to one or more embodiments, the toolkit module 170 may provide the system-level toolkit as a module that may be opened for use within any application, or may be provided automatically due to any number of triggers. The toolkit may be provided within an XR environment of a multi-user communication session. As an example, as will be described below, characteristics of a presentation of virtual objects within an environment may cause the toolkit to be provided to the user. The toolkit module 170 may be provided in the form of a menu of tools which may facilitate interaction between active users in a multi-user communication session according to one or more embodiments.

In one or more embodiments, as shown at 310, the toolkit module 170 may determine preferred tools. According to one or more embodiments, the presentation of the tools may be determined based on a determination of preferred tools. For example, preferred tools may be presented in a preferred position in a menu, such as a front or a top of a menu. As another example, preferred tools may be included in a menu, whereas one or more tools which are determined to not be preferred may not be included in the menu.

Tools may be determined to be preferred in a number of ways. For example, tools may be determined to be preferred based on a user profile or system profile. That is, a user's profile may be associated with preferred tools, or preferred configuration of tools (e.g., editing tools of a particular color, size of virtual note pad, and the like). Further, a particular device or system may be associated with preferred tools. As another example, a determination of preferred tools may additionally, or alternatively, be determined at run time, for example based on one or more applications running at the time the toolbox is utilized. According to one or more embodiments, the functionality or other characteristics of one or more applications running in the environment may lend themselves to the use of some of the tools more than others. At 315, the toolkit module 170 may display tools for selection and use.

The flowchart continues at 320, where the toolkit module 170 detects a user interaction by first tool to create a virtual modification. The virtual modification may be a user interaction with the tool that causes a change to the environment or object within the environment. The change may or may not cause a corresponding change in the display of the environment of the object. As an example, the user may utilize an editing tool to add text or drawings to the environment. As another example, a user may utilize the tool to bring attention to a particular portion of the environment, such as by using a pointing tool, or a gesture tool which provides a virtual gesture near a particular portion of the environment, even if the user is not actually located near the portion of the environment. As another example, the virtual modification may be an addition to the environment, such as from a digital asset library associated with the user, or the like.

At 325, the toolkit module 170 provides the virtual modification for presentation at a second device 110. According to one or more embodiments, the toolkit module 170 may provide the virtual modification by providing some combination of the content of the modification (e.g., content created/deleted, selection made, configuration(s) changed, etc.) caused by the tool, the location of the virtual modification generated by the tool, and an indication of the tool and/or configuration of the tool.

At 330, the toolkit module 170 determines the location and content of the virtual modification. The location of the virtual modification may be determined in relation to a portion or location of the environment to which the virtual addition is related. For example, if the virtual modification is a virtual addition to a portion of a virtual object, the location may be provided in relation to the virtual object. As another example, if the virtual addition is intended to bring attention to a particular portion or location of the environment, the location may be provided in relation to the portion of the environment to which attention is directed by the virtual addition. According to one or more embodiments, at 335, the toolkit module 170 provides the location and content of the virtual modification to an application associated with the multi-user communication session for synchronization. In one or more embodiments, the content may include the tool by which the content was created, such as a configuration of an editing tool and/or the content created by the editing tool. As another example, the content may be the tool itself, such as a pointer tool or gesture tool, along with a configuration of the tool, such as a direction of the pointer and the particular gesture.

The flowchart continues at 340, where electronic device 110 receives an indication of the virtual modification. According to one or more embodiments, the indication may include data associated with the virtual modification that is needed by the electronic device 110 to render the virtual addition for view by a user of electronic device 110. As such, the indication may include, for example, data regarding the content of the virtual modification, the location of the virtual modification, and/or the tool or tool configuration used to create the virtual modification. At 345, the electronic device 110 determines the location and content of the virtual modification, for example, from the received indication. According to one or more embodiments, at 350, the location and content of the virtual modification are provided to an application associated with the multi-user communication session for synchronization. As will be described below, information regarding the virtual modification is optionally provided to an application running on the electronic device 110 within which the virtual modification is made so that the virtual modification will be imperceptible to the application.

The flowchart concludes at 355, where the electronic device 110 renders the virtual modification. According to one or more embodiments, an XR module at electronic device 110 may render the virtual modification according to the received indication from 340 such that the virtual modification may be experienced by a user of electronic device 110.

Figure 4:
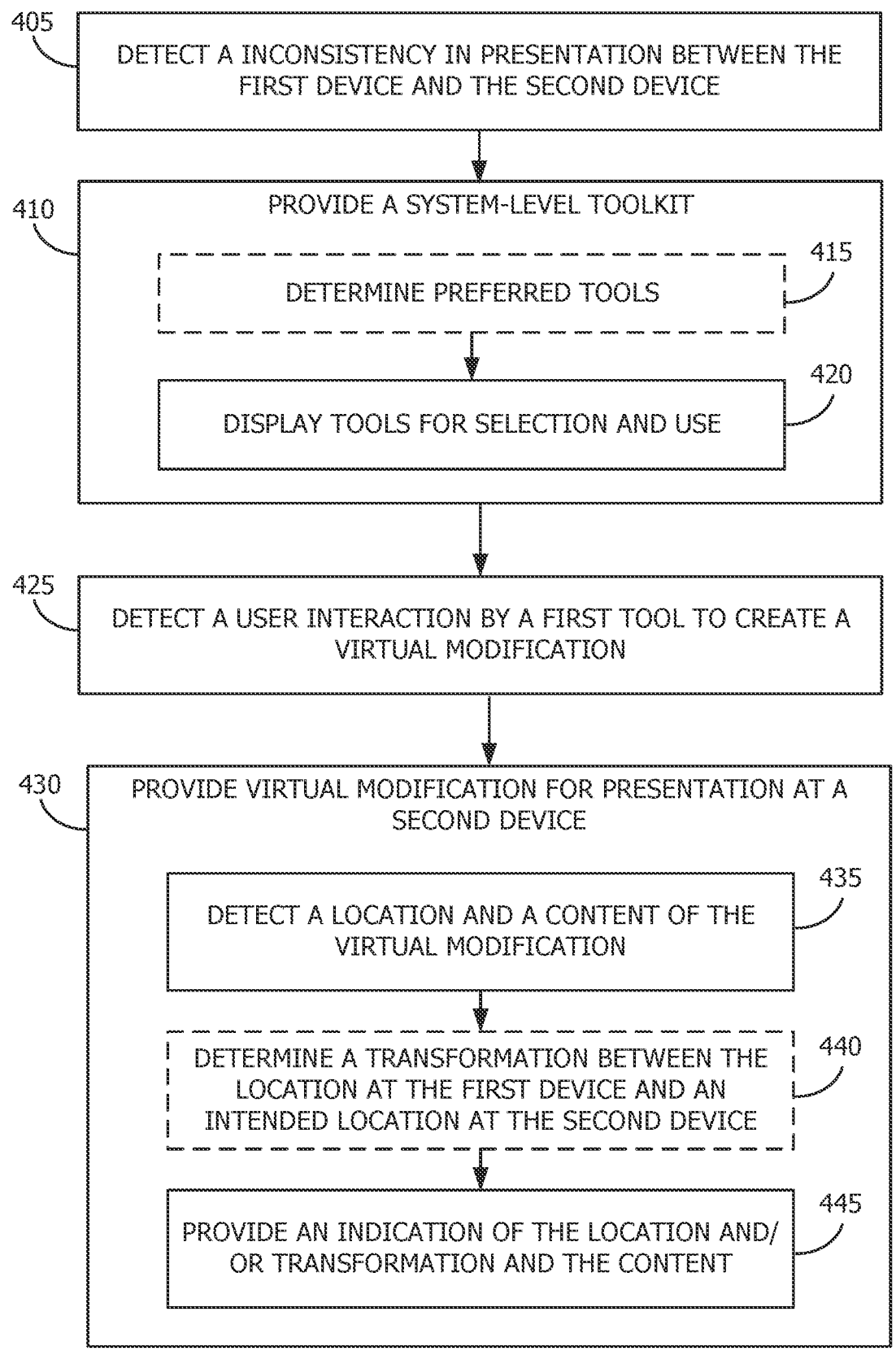
FIG. 4 shows a flowchart for utilizing tools to provide context of a virtual modification in an XR environment.

FIG. 4 shows a flowchart for utilizing tools to provide context of a virtual modification in an XR environment. For purposes of explanation, the flowchart is described utilizing example components from FIG. 1. Although the flowchart shows various procedures performed by particular components in a particular order, it should be understood that according to one or more embodiments, the various processes may be performed by alternative devices or modules. In addition, the various processes may be performed in an alternative order, and various combinations of the processes may be performed simultaneously. Further, according to some embodiments, one or more of the processes may be omitted, or others may be added.

The flowchart begins at 405, where the toolkit module detects an inconsistency in presentation between the first device and the second device. An inconsistency may be determined, for example, when spatial truth is lost between presentation of virtual objects between two devices. For example, because of differences in availability in the physical environment in which the electronic devices are operating, virtual items and/or avatars corresponding to users active in the session, may not be displayed consistently. As another example, in one or more embodiments, a user may duplicate or move a shared virtual object such that the location of the virtual object is updated on one device, but not all other devices in the active session.

The flowchart continues at 410, where the toolkit module 170 provides a system-level toolkit. As described above, the toolkit may be a system-level toolkit in that it is tied to the computing environment of the device, and not to any particular third party application. That is, the toolkit may be accessible regardless of a particular application running on the device. According to one or more embodiments, the toolkit module 170 may provide the system-level toolkit as a module that may be opened for use within any application, or may be provided automatically due to any number of triggers. As an example, as will be described below, characteristics of a presentation of virtual objects within an environment may cause the toolkit to be provided to the user. The toolkit module 170 may be provided in the form of a menu of tools which may facilitate interaction between active users in a multi-user communication session according to one or more embodiments.

According to one or more embodiments, at 415, the toolkit module 170 determines preferred tools. As described above, the preferred tools may be determined in any number of ways. Additionally, the preferred tools may be determined based on the inconsistency in presentation, such as identifying tools that give context to the user utilizing the tool even if the user and the content are not consistently located in relation to each other among active devices in the session. The flowchart continues at 420, where the toolkit module 170 displays the tools for selection and use.

At 425, the toolkit module 170 detects a user interaction via a first tool to create a virtual modification. As described above, the virtual interaction may be a user interaction with the tool that causes a change to the environment or object within the environment. The flowchart continues at 430, where the virtual modification is provided for presentation at the second device. According to one or more embodiments, the toolkit module 170 may provide the virtual modification by providing some combination of the modification (e.g., content created/deleted, selection made, configuration(s) changed, etc.) caused by the tool, the location of the virtual modification generated by the use of the tool, and an indication of the tool and/or configuration of the tool.

At 435, the toolkit module 170 detects a location and a content of the virtual modification. The location of the virtual modification may be determined in relation to a portion or location of the environment to which the virtual addition is related. According to one or more embodiments, the toolkit module 170 determines a transformation between the location at the first device and an intended location at the second device. In one or more embodiments, the transformation may determine a spatial relationship between how the virtual modification is displayed by the device generating the virtual modification, and a secondary device receiving the virtual modification. In one or more embodiments, the transformation may be determined according to a spatial relationship between a tool and the portion of the environment to which the virtual modification is applied in the environment of the first device, and a portion of the environment to which the virtual modification is to be applied in the environment of the second device. The flowchart concludes at 445, where the toolkit module provides an indication of the location and/or transformation and the content.

Figure 5:
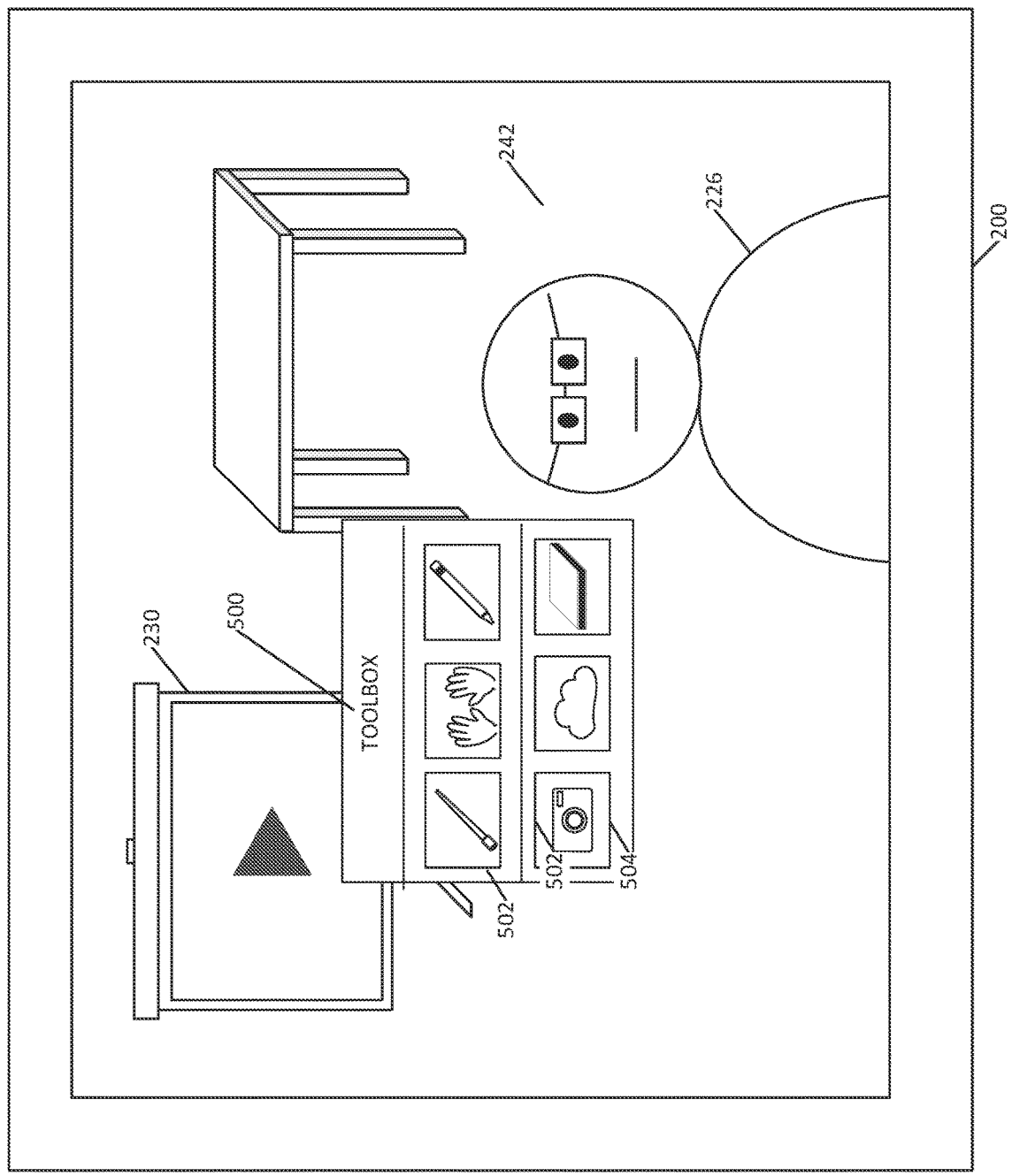
FIG. 5 shows an example user interface for selecting and utilizing a tool.

FIG. 5 shows an example user interface for selecting and utilizing a tool. The example display is merely for explanation purposes, and is not intended to limit the disclosure.

As described above, the toolkit module 170 may provide access to one or more tools which may be utilized to provide virtual modifications within an environment. In the example shown, a user is utilizing device 200 to interact in a multi-user communication session with another user depicted by avatar 226. According to one or more embodiments, the toolbox menu 500 may be provided at any time, or maybe offered in response to determining an inconsistency in presentation of virtual items within environment 242 and an environment associated with the user depicted by avatar 226.

According to one or more embodiments, the tools presented for selection may differ according to context and/or user or system preferences. For example, tools that are preferred based on user preferences, system preferences, or the like may be presented in a preferential location, such as a top portion of a menu. As another example, tools may be depicted in a preferred location based on a user context or application context. For example, some applications may be more amenable to some tools over others. As shown, the virtual presentation screen 230 is being utilized by the user. As such, the user is likely viewing media items on the presentation screen. As such, the first tools depicted in the menu 500 include a pointing tool, a gesture tool, and an editing tool. On the other hand, tools such as a virtual camera, access to a digital asset library, and sticky notes may be less useful when viewing media in an application, and so those icons are shown below, as with virtual camera icon 504.

Figure 6:
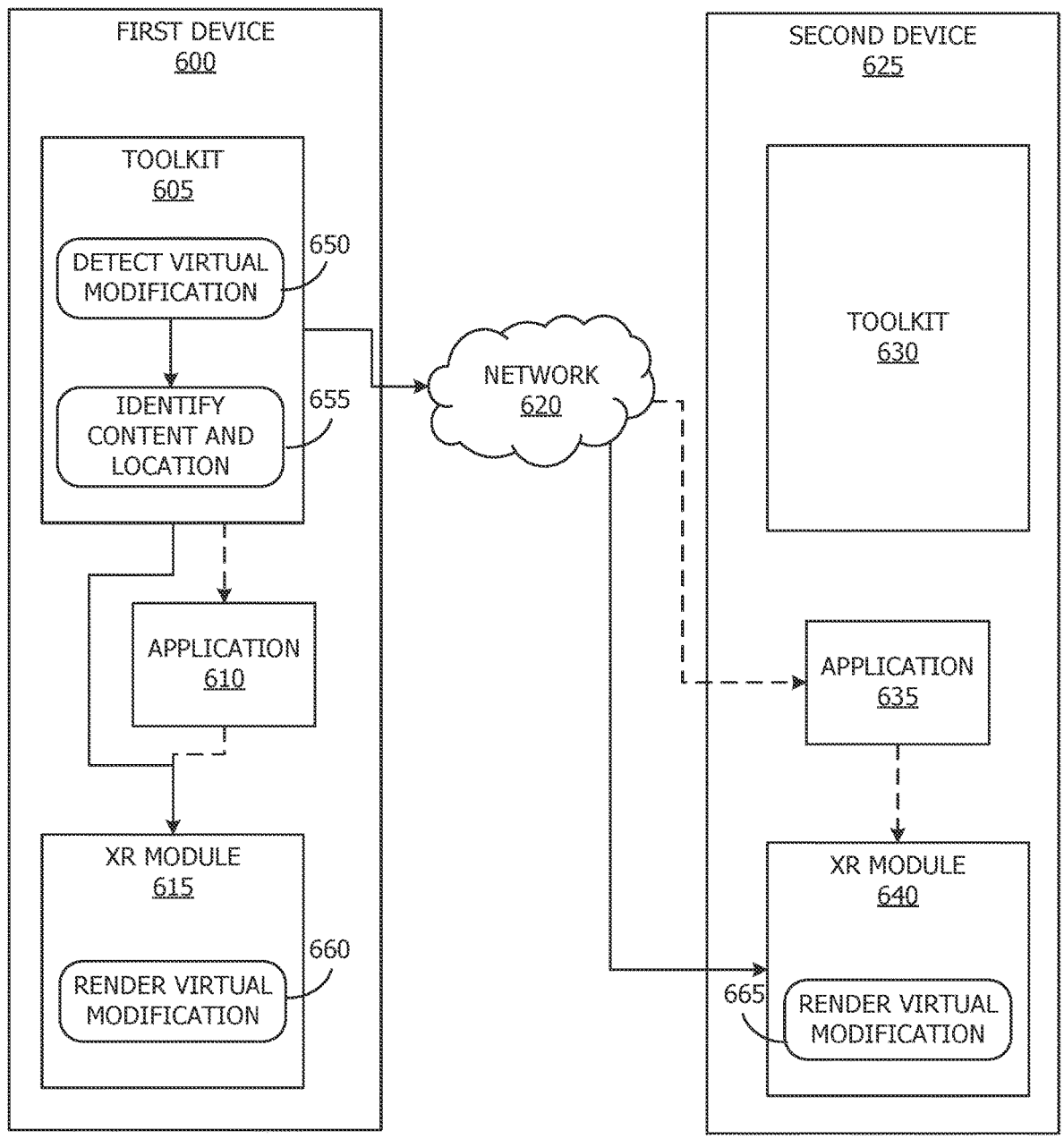
FIG. 6 shows an example flow diagram for synchronizing virtual modifications across devices in a multi-user communication session.

FIG. 6 shows an example flow diagram for synchronizing virtual modifications across devices in the multi-user communication session. Although the flow diagram shows various procedures performed by particular components in a particular order, it should be understood that according to one or more embodiments, the various processes may be performed by alternative devices or modules. In addition, the various processes may be performed in an alternative order, and various combinations of the processes may be performed simultaneously. Further, according to some embodiments, one or more of the processes may be omitted, or others may be added.

The diagram includes a first device 600 and a second device 625, which are active in a multi-user communication session across network 620. First device 600 includes a toolkit 605, multi-user communication session application 610, and an XR module 615. As described above, the toolkit 605 provides a system-level set of tools which may be used across applications, such as multi-user communication session application 610, by which a multi-user communication session is experienced. The virtual modifications and other virtual objects may be rendered by XR module 615. Similarly, second device 625 includes a toolkit 630, multi-user communication session application 635, and XR module 640. The toolkit 630 provides a system-level set of tools which may be used across applications, such as multi-user communication session application 635, by which a multi-user communication session may be experienced. The virtual modifications and other virtual objects may be rendered by XR module 640.

The flow diagram begins at 650, where the toolkit 605 detects a virtual modification, as described above with respect to FIGS. 3-4. Then, at 655, the toolkit 605 identifies a content and location of the virtual modification. The content and location may be utilized by XR module 615 to render the virtual modification at 660. According to one or more embodiments, the content and location of the virtual modification may be shared with the multi-user communication session application 610, such that the instance of the multi-user communication session application running on the device one system 600 is aware of the virtual modification and its contents. As such, and one or more embodiments, the device one application 610 may share the content and location of the virtual modification across network 620 with the multi-user communication session application 635, which may be a second instance of the multi-user communication session application running on the second device 625. Alternatively, or additionally, the device one system 600 may bypass the multi-user communication session application 610 and/or the multi-user communication session application 635, and the virtual modification may be shared with the device to XR module 640 such that the virtual modification is rendered at 665. By bypassing one or more of the multi-user communication session applications, the virtual modification may be synchronized across devices while providing a level of privacy to the users by not sharing content with the applications.

Figure 7:
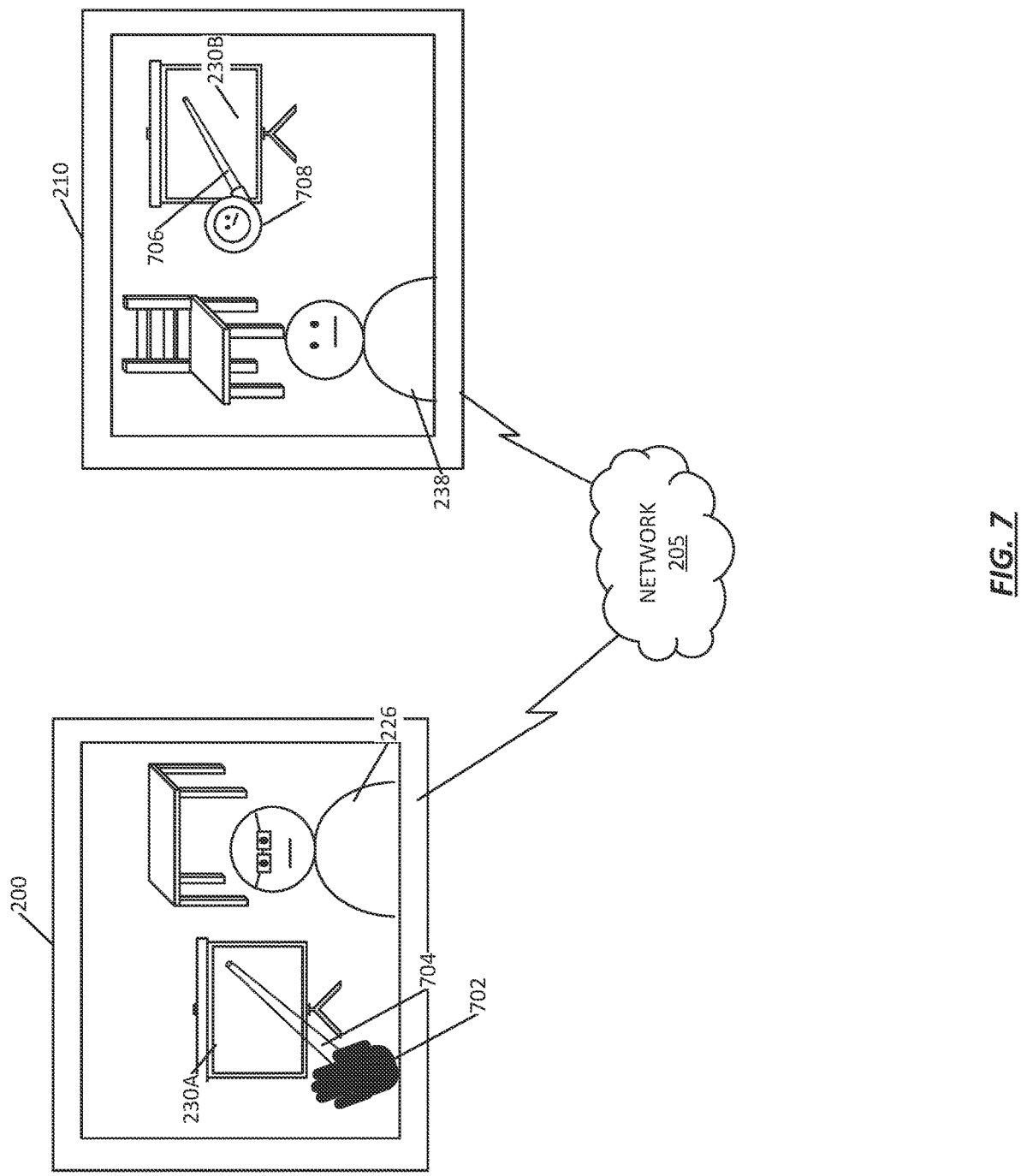
FIG. 7 shows an example system diagram of a user interface for selecting and utilizing a tool.

FIG. 7 shows an example system diagram of a view of an XR environment as depicted by two devices in separate physical environments. Specifically, device 200 and device 210 are connected across network 205, and are depicted as being active in a multi-user communication session. The example system diagram should be understood to be for example purposes and is not intended to be limiting the disclosure.

The first device 200 shows the view of the XR environment in which device 210 is also active. As such, avatar 226 appears within the view of device 200 as a representation of the user of the second device 210. Similarly, the second device 210 shows the view of the XR environment in which device 200 is also active. As such, avatar 238 represents a user of device 200. The view of the environment through device 200 shows a virtual presentation screen 230A, whereas the view of the environment through device 210 shows the virtual presentation screen 230B which is in a different location, indicating an inconsistency among presentations of the virtual elements by first device 200 and second device 210.

The indication of the hand 702 provides a view of the hand of the user of device 200 as it is viewed within the display of device 200. As shown, the user of device 200 may utilize pointer tool 704 to bring attention to a particular location on the virtual presentation screen 230A. The use of the pointer tool to bring attention to a particular location on the virtual presentation screen may comprise a virtual modification, according to one or more embodiments. As described above, device 200 may identify a location and a content of the virtual modification for presentation at other devices active in the multi-user communication session, such as device 210. For purposes of this example, the location may be a relative location to one or more aspects of the environment, such as a portion of the virtual presentation screen 230A. In one or more embodiments, the location may be provided in terms of a coordinate system of the device 200, a coordinate system of device 210, a common coordinate system among devices, or the like. As described above, the virtual modification may be shared via a multi-user communication session application within which the virtual modification is utilized, such as the virtual presentation screen 230A, or the virtual modification may be provided to the device 210 so as to bypass the application in which the virtual modification is utilized.

As described above, and one or more embodiments, tools may be used to provide context when a presentation of the virtual objects within a multi-user communication session are inconsistently presented across multiple devices. As such, the display of device 200 shows that the user 702 of device 200 can utilize the pointer tool 704 to appoint to a particular location in the virtual presentation screen 230A. However, within the display of device 210, user 702 of device 200 appears as avatar 238, which is not near the presentation of the virtual presentation screen 230B. As described above, the indication of the virtual modification, such as the content and location of the virtual modification, may be shared with electronic device 210, such that the pointer tool 706 appears to be pointing at a same location on the virtual presentation screen 230B as the pointer tool 704 is pointing to on the virtual presentation screen 230A within the display of device 200. Notably, the pointer tool 706 appears consistent in relation to the object which is the subject of the interaction (e.g., the presentation screen 230), even though the tool is displayed inconsistently with the user utilizing the tool. Said another way, although the tool appears to be held by user 702 in the view of device 200, the tool 706 does not appear to be held by the avatar 238 representing user 702 in display 210. According to one or more embodiments, by disjoining the connection between the user and the tool, context may be provided to a user of electronic device 210 to indicate how the user 702 is interacting with the environment. In one or more embodiments, the tool 706 may additionally include an indication of a user to which the tool belongs. As an example, the pointer 706 may be presented along with a user identifier 708 indicating to which user the tool belongs.

Figure 8A:
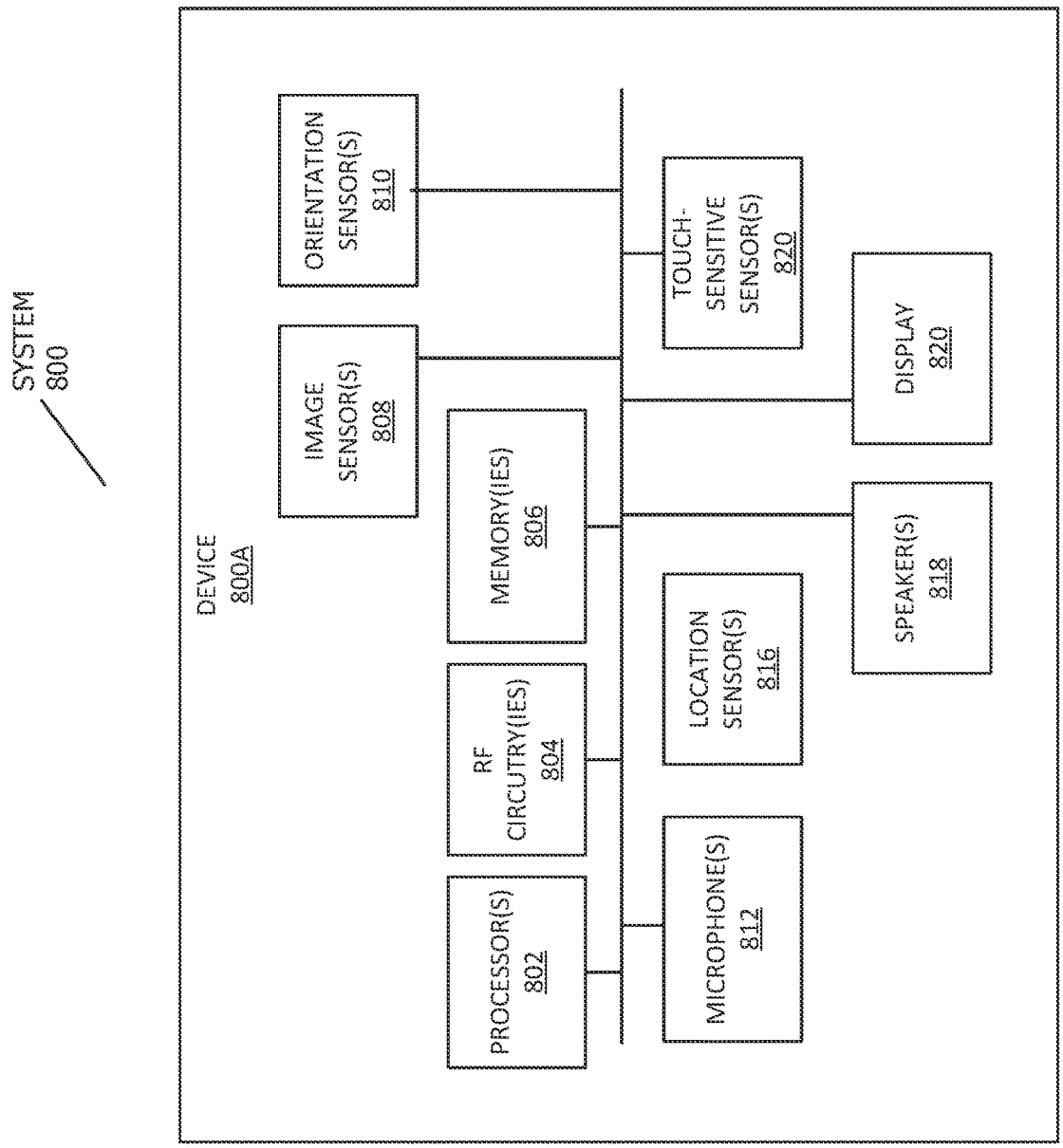
FIG. 8A-8B show exemplary systems for use in various extended reality technologies.
Figure 8B:
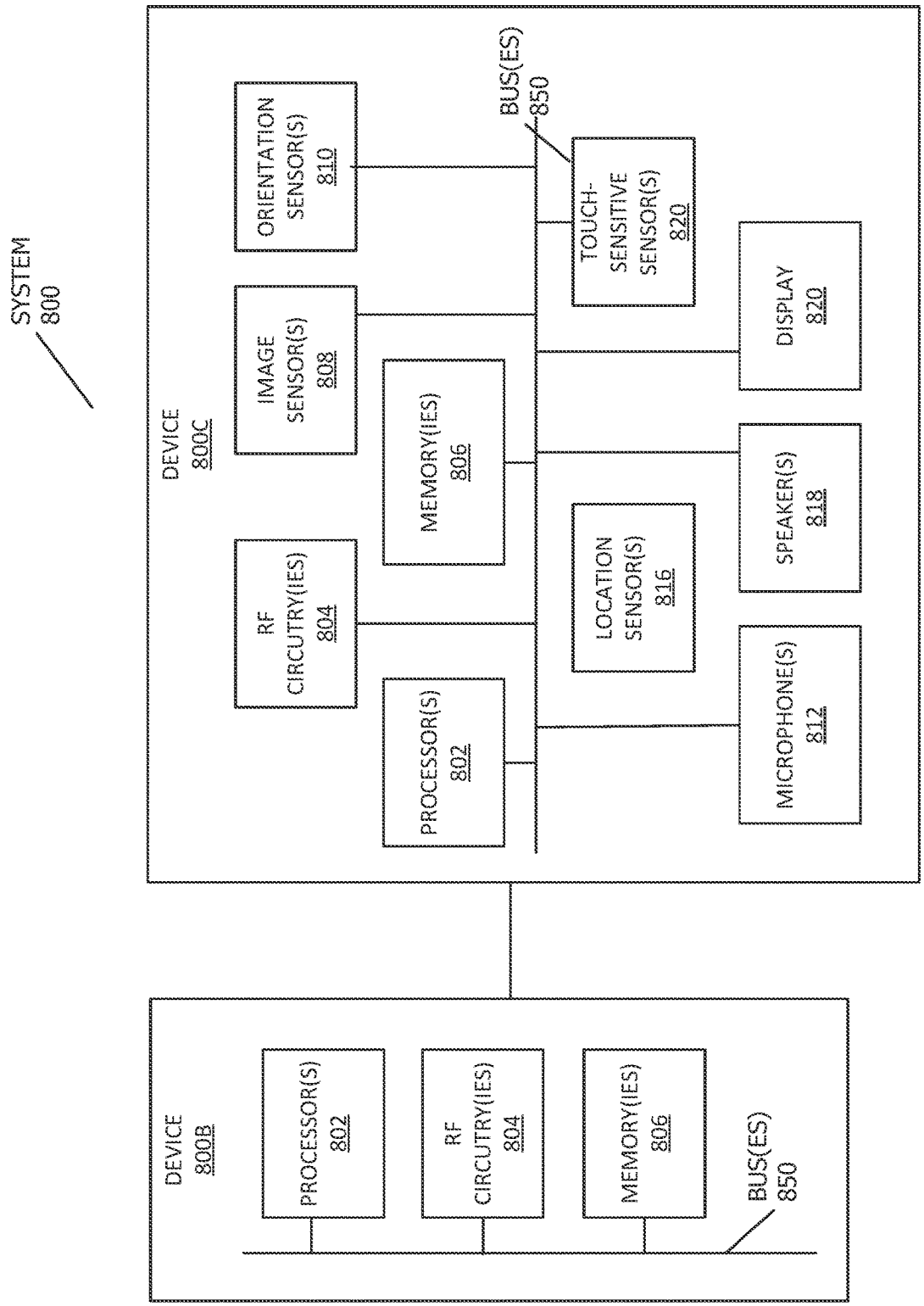

FIG. 8A and FIG. 8B depict exemplary system 800 for use in various extended reality technologies.

In some examples, as illustrated in FIG. 8A, system 800 includes device 800a. Device 800a includes various components, such as processor(s) 802, RF circuitry(ies) 804, memory(ies) 806, image sensor(s) 808, orientation sensor(s) 810, microphone(s) 812, location sensor(s) 816, speaker(s) 818, display(s) 820, and touch-sensitive surface(s) 822. These components optionally communicate over communication bus(es) 850 of device 800a.

In some examples, elements of system 800 are implemented in a base station device (e.g., a computing device, such as a remote server, mobile device, or laptop) and other elements of system 800 are implemented in a second device (e.g., a head-mounted device). In some examples, device 800a is implemented in a base station device or a second device.

As illustrated in FIG. 8B, in some examples, system 800 includes two (or more) devices in communication, such as through a wired connection or a wireless connection. First device 800b (e.g., a base station device) includes processor(s) 802, RF circuitry(ies) 804, and memory(ies) 806. These components optionally communicate over communication bus(es) 850 of device 800b. Second device 800c (e.g., a head-mounted device) includes various components, such as processor(s) 802, RF circuitry(ies) 804, memory(ies) 806, image sensor(s) 808, orientation sensor(s) 810, microphone(s) 812, location sensor(s) 816, speaker(s) 818, display(s) 820, and touch-sensitive surface(s) 822. These components optionally communicate over communication bus(es) 850 of device 800c.

System 800 includes processor(s) 802 and memory(ies) 806. Processor(s) 802 include one or more general processors, one or more graphics processors, and/or one or more digital signal processors. In some examples, memory(ies) 806 are one or more non-transitory computer-readable storage mediums (e.g., flash memory, random access memory) that store computer-readable instructions configured to be executed by processor(s) 802 to perform the techniques described below.

System 800 includes RF circuitry(ies) 804. RF circuitry(ies) 804 optionally include circuitry for communicating with electronic devices, networks, such as the Internet, intranets, and/or a wireless network, such as cellular networks and wireless local area networks (LANs). RF circuitry(ies) 804 optionally includes circuitry for communicating using near-field communication and/or short-range communication, such as Bluetooth®.

System 800 includes display(s) 820. Display(s) 820 may have an opaque display. Display(s) 820 may have a transparent or semi-transparent display that may incorporate a substrate through which light representative of images is directed to an individual's eyes. Display(s) 820 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 820 include heads up displays, automotive windshields with the ability to display graphics, windows with the ability to display graphics, lenses with the ability to display graphics, tablets, smartphones, and desktop or laptop computers. Alternatively, system 800 may be designed to receive an external display (e.g., a smartphone). In some examples, system 800 is a projection-based system that uses retinal projection to project images onto an individual's retina or projects virtual objects into a physical setting (e.g., onto a physical surface or as a holograph).

In some examples, system 800 includes touch-sensitive surface(s) 822 for receiving user inputs, such as tap inputs and swipe inputs. In some examples, display(s) 820 and touch-sensitive surface(s) 822 form touch-sensitive display(s).

System 800 includes image sensor(s) 808. Image sensors(s) 808 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 808 also optionally include one or more event camera(s) configured to capture movement of physical elements in the physical setting. Image sensor(s) 808 also optionally include one or more depth sensor(s) configured to detect the distance of physical elements from system 800. In some examples, system 800 uses CCD sensors, event cameras, and depth sensors in combination to detect the physical setting around system 800. In some examples, image sensor(s) 808 include a first image sensor and a second image sensor. The first image sensor and the second image sensor are optionally configured to capture images of physical elements in the physical setting from two distinct perspectives. In some examples, system 800 uses image sensor(s) 808 to receive user inputs, such as hand gestures. In some examples, system 800 uses image sensor(s) 808 to detect the position and orientation of system 800 and/or display(s) 820 in the physical setting. For example, system 800 uses image sensor(s) 808 to track the position and orientation of display(s) 820 relative to one or more fixed elements in the physical setting.

In some examples, system 800 includes microphones(s) 812. System 800 uses microphone(s) 812 to detect sound from the user and/or the physical setting of the user. In some examples, microphone(s) 812 includes an array of microphones (including a plurality of microphones) that optionally operate in tandem, such as to identify ambient noise or to locate the source of sound in space of the physical setting.

System 800 includes orientation sensor(s) 810 for detecting orientation and/or movement of system 800 and/or display(s) 820. For example, system 800 uses orientation sensor(s) 810 to track changes in the position and/or orientation of system 800 and/or display(s) 820, such as with respect to physical elements in the physical setting. Orientation sensor(s) 810 optionally include one or more gyroscopes and/or one or more accelerometers.

Various processes defined herein consider the option of obtaining and utilizing a user's personal information. For example, such personal information may be utilized in order to provide a system-level toolkit for user in an XR environment. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 3-4 and 6 or the arrangement of elements shown in FIGS. 1, 2, 5, and 7-8 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for facilitating collaboration in a multi-user communication session, comprising:
    detecting, at a first electronic device, an inconsistent environment representation of a multi-user communication session in which a first user of the first electronic device and a second user of a second electronic device are active, wherein a first location of a shared virtual element in a first environment representation at the first electronic device differs from a second location of the shared virtual element in a second environment representation at the second electronic device;
    in response to detecting the inconsistent environment representation, launching a system-level toolkit comprising a plurality of system-level tools for generating virtual modifications within the multi-user communication session, wherein the system-level toolkit is accessible to multiple applications executing on the first electronic device; and
    in response to detecting a first user interaction between the shared virtual element and a first tool in the system-level toolkit by the first user, providing, to the second electronic device, an indication of a virtual modification corresponding to the first user interaction and the shared virtual element to the second electronic device, wherein virtual modification is presented at the second location at the second electronic device in accordance with the indication of the shared virtual element.

2. The method of claim 1, wherein the inconsistent environment representation occurs when spatial truth is lost between a first graphical representation of the multi-user communication session presented at the first electronic device and a second graphical representation of the multi-user communication session presented at the second electronic device.

3. The method of claim 2, wherein the first graphical representation of the multi-user communication session at the first electronic device corresponds to a different perspective of the multi-user communication session than the second graphical representation of the multi-user communication session.

4. The method of claim 2, wherein the first graphical representation of the multi-user communication session comprises a first spatial relationship between the first user, a representation of the second user, and the shared virtual element,
    wherein the second graphical representation of the multi-user communication session comprises a second spatial relationship between a representation of the first user, the second user, and the shared virtual element, and
    wherein the first spatial relationship is different than the second spatial relationship.

5. The method of claim 4, further comprising:
    determining a transformation between the first spatial relationship and the second spatial relationship, wherein the virtual modification is rendered at the second electronic device according to the determined transformation.

6. The method of claim 1, wherein providing the system-level toolkit further comprises:
determining, based on the detected inconsistent representations of the shared virtual element, one or more preferred system-level tools; and
presenting the system-level toolkit such that the preferred system-level tools are displayed first.

7. The method of claim 1, wherein providing the system-level toolkit comprises:
detecting a second user interaction with the first tool in the system-level toolkit in association with an application, wherein the second user interaction causes a second virtual modification within the multi-user communication session; and
in response to detecting the second user interaction, providing an indication of the second virtual modification to the second electronic device.

8. A non-transitory computer readable medium comprising computer readable code executable by one or more processors to:
detect, at a first electronic device, an inconsistent environment representation of a multi-user communication session in which a first user of the first electronic device and a second user of a second electronic device are active, wherein a first location of a shared virtual element in a first environment representation at the first electronic device differs from a second location of the shared virtual element in a second environment representation at the second electronic device;
in response to detecting the inconsistent environment representation, launch a system-level toolkit comprising a plurality of system-level tools for generating virtual modifications within the multi-user communication session, wherein the system-level toolkit is accessible to multiple applications executing on the first electronic device; and
in response to detecting a first user interaction between the shared virtual element and a first tool in the system-level toolkit by the first user, provide, to the second electronic device, an indication of a virtual modification corresponding to the first user interaction and the shared virtual element to the second electronic device, wherein virtual modification is presented at the second location at the second electronic device in accordance with the indication of the shared virtual element.

9. The non-transitory computer readable medium of claim 8, wherein the inconsistent environment representation occurs when spatial truth is lost between a first graphical representation of the multi-user communication session presented at the first electronic device and a second graphical representation of the multi-user communication session presented at the second electronic device.

10. The non-transitory computer readable medium of claim 9, wherein the first graphical representation of the multi-user communication session at the first electronic device corresponds to a different perspective of the multi-user communication session than the second graphical representation of the multi-user communication session.

11. The non-transitory computer readable medium of claim 9, wherein the first graphical representation of the multi-user communication session comprises a first spatial relationship between the first user, a representation of the second user, and the shared virtual element,
wherein the second graphical representation of the multi-user communication session comprises a second spatial relationship between a representation of the first user, the second user, and the shared virtual element, and
wherein the first spatial relationship is different than the second spatial relationship.

12. The non-transitory computer readable medium of claim 11, further comprising computer readable code to:
determine a transformation between the first spatial relationship and the second spatial relationship,
wherein the virtual modification is rendered at the second electronic device according to the determined transformation.

13. The non-transitory computer readable medium of claim 8, wherein the computer readable code to provide the system-level toolkit further comprises computer readable code to:
determine, based on the detected inconsistent representations of the shared virtual element, one or more preferred system-level tools; and
present the system-level toolkit such that the preferred system-level tools are displayed first.

14. The non-transitory computer readable medium of claim 8, wherein the computer readable code to provide the system-level toolkit further comprises computer readable code to:
detect a second user interaction with the first tool in the system-level toolkit in association with an application, wherein the second user interaction causes a second virtual modification within the multi-user communication session; and
in response to detecting the second user interaction, provide an indication of the second virtual modification to the second electronic device.

15. A system comprising:
one or more processors; and
one or more computer readable media comprising computer readable code executable by the one or more processors to:
detect, at a first electronic device, an inconsistent environment representation of a multi-user communication session in which a first user of the first electronic device and a second user of a second electronic device are active, wherein a first location of a shared virtual element in a first environment representation at the first electronic device differs from a second location of the shared virtual element in a second environment representation at the second electronic device;
in response to detecting the inconsistent environment representation, launch a system-level toolkit comprising a plurality of system-level tools for generating virtual modifications within the multi-user communication session, wherein the system-level toolkit is accessible to multiple applications executing on the first electronic device; and
in response to detecting a first user interaction between the shared virtual element and a first tool in the system-level toolkit by the first user, provide, to the second electronic device, an indication of a virtual modification corresponding to the first user interaction and the shared virtual element to the second electronic device, wherein the virtual modification is presented at the second location at the second electronic device in accordance with the indication of the shared virtual element.

16. The system of claim 15, wherein the inconsistent environment representation occurs when spatial truth is lost between a first graphical representation of the multi-user communication session presented at the first electronic device and a second graphical representation of the multi-user communication session presented at the second electronic device.

17. The system of claim 16, wherein the first graphical representation of the multi-user communication session comprises a first spatial relationship between the first user, a representation of the second user, and the shared virtual element, wherein the second graphical representation of the multi-user communication session comprises a second spatial relationship between a representation of the first user, the second user, and the shared virtual element, and wherein the first spatial relationship is different than the second spatial relationship.

18. The system of claim 17, further comprising computer readable code to:

determine a transformation between the first spatial relationship and the second spatial relationship, wherein the virtual modification is rendered at the second electronic device according to the determined transformation.

19. The system of claim 15, wherein the computer readable code to provide the system-level toolkit further comprises computer readable code to:

determine, based on the detected inconsistent representations of the shared virtual element, one or more preferred system-level tools; and present the system-level toolkit such that the preferred system-level tools are displayed first.

20. The system of claim 14, wherein the computer readable code to provide the system-level toolkit further comprises computer readable code to:

detect a second user interaction with the first tool in the system-level toolkit in association with an application, wherein the second user interaction causes a second virtual modification within the multi-user communication session; and in response to detecting the second user interaction, provide an indication of the second virtual modification to the second electronic device.

* * * * *